United States Patent [19]

Yomoda

[11] 4,358,029
[45] Nov. 9, 1982

[54] DILUTING AND POURING APPARATUS FOR A LIQUID FOOD

[75] Inventor: Kenju Yomoda, Honjo, Japan

[73] Assignee: Lotte Company Limited, Tokyo, Japan

[21] Appl. No.: 175,042

[22] Filed: Aug. 4, 1980

[30] Foreign Application Priority Data

Aug. 7, 1979 [JP] Japan .................................. 54-99880
Apr. 25, 1980 [JP] Japan .................................. 55-54362

[51] Int. Cl.³ .............................................. B67D 5/60
[52] U.S. Cl. ................................ 222/133; 99/289 R; 222/148; 222/368
[58] Field of Search ........... 222/129.1, 129.3, 146 HS, 222/133, 145, 367, 368, 148; 99/289 R, 302 R

[56] References Cited

U.S. PATENT DOCUMENTS 2,898,843 8/1959 Rockriver ........................ 99/302 R
3,130,879 4/1964 Messing ............................. 222/368

FOREIGN PATENT DOCUMENTS 870763 6/1961 United Kingdom ............. 99/289 R

*Primary Examiner*—H. Grant Skaggs
*Attorney, Agent, or Firm*—Wenderoth, Lind & Ponack

[57] ABSTRACT

A diluting and pouring apparatus for a liquid food such as soup or juice supplied in a raw or condensed state is disclosed which comprises a casing having a circular inner periphery and a rotor supported rotatably in the casing so that while rotating it always provides three discrete chambers, the first chamber being for cleaning, the second chamber being for receiving a constant amount of the raw liquid and the third chamber being for diluting the raw liquid with a diluent and pouring the diluted liquid.

4 Claims, 3 Drawing Figures

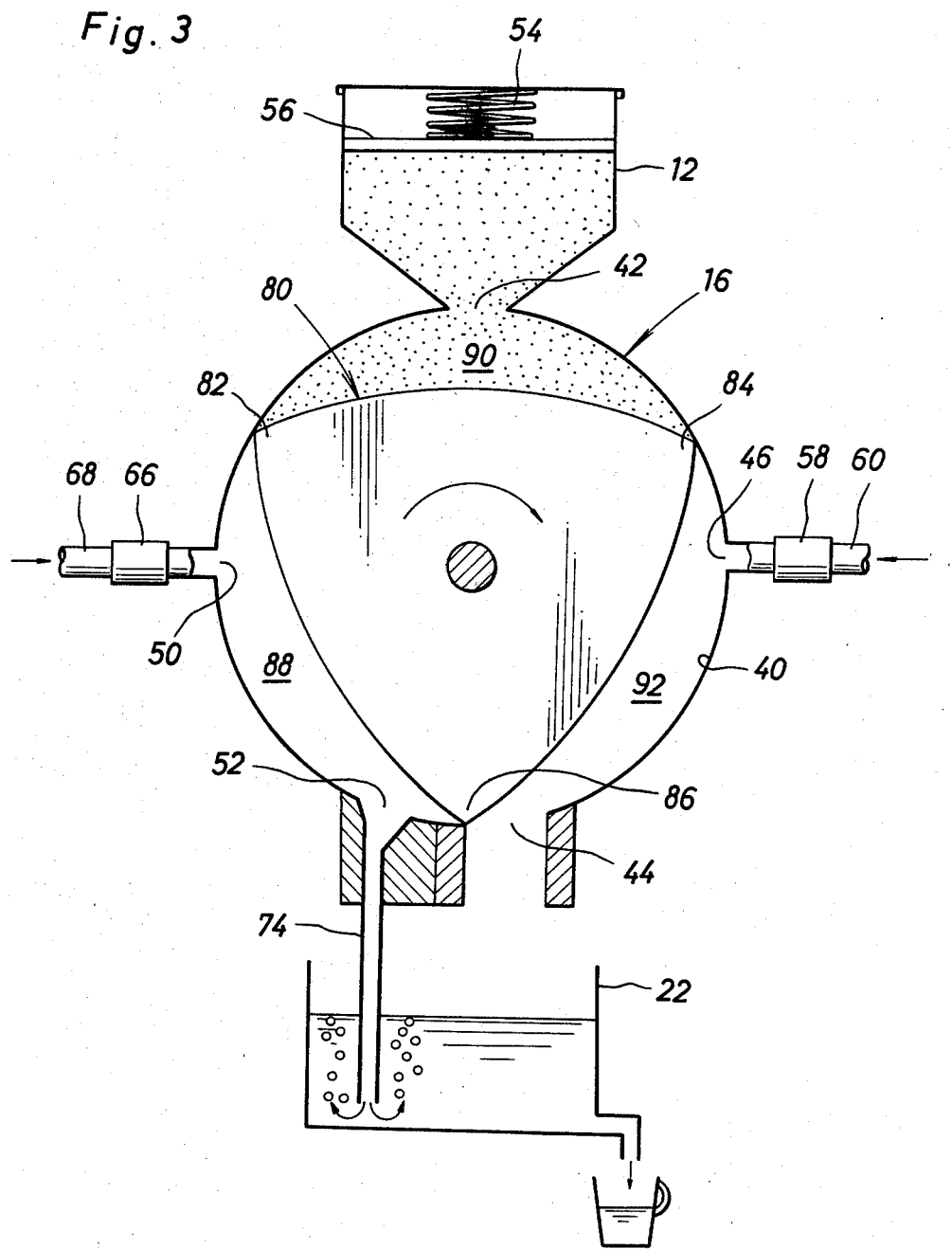

DILUTING AND POURING APPARATUS FOR A LIQUID FOOD

BACKGROUND OF THE DISCLOSURE

The present invention relates to a diluting and pouring apparatus for liquid food such as soup or juice which may be supplied in a condensed state.

In, for example, a fast food store etc. in which a liquid food is sold, it is required to serve an ordered amount of the liquid food immediately. Since the order of food may be frequent, it is further required to serve them continuously within a short time. Additionally, liquid food served in the store must be always stable in taste density and temperature. This further requires that the liquid food must be served without segregation of constituents thereof.

SUMMARY OF THE INVENTION

An object of the present invention is to provide a diluting and pouring apparatus for liquid food which is suitable to use in a fast food store where a liquid food such as soup or juice which is supplied in the condensed state is served continuously and efficiently by automatically diluting the original condensed liquid food and pouring a constant amount of it cup by cup.

In order to achieve the above object according to the present invention, a casing having a circular inner peripheral face is provided within which a rotor is rotatably supported. The rotor while it is rotated functions to provide three discrete chambers in the interior of the casing. The chambers are defined by the inner peripheral face of the casing and an outer periphery of the rotor and have the same volume. When one of the chambers is in a state of cleaning, the second chamber is supplied with a constant amount of the condensed liquid food and in the third chamber a diluent is added to the condensed liquid and a diluted liquid food is poured therefrom. The order of the chambers is continuously changed in sequence with the rotation of the rotor within the casing.

Another object of the present invention is to provide a diluting and pouring apparatus of the above mentioned type by which the condensed liquid food is smoothly supplied from a tank provided in the apparatus to one of the chambers which is in the liquid food filling state and the diluted liquid food is smoothly guided to pour from another chamber which is in the diluting and pouring state.

In order to achieve this object, according to the present invention, an inlet port for the raw liquid food is provided at a top portion of the casing and an outlet port for the diluted liquid food is provided at a lower end portion of the casing. The condensed liquid food tank is provided in an upper portion of the apparatus to facilitate a connection thereof to the inlet port of the casing.

A further object of the present invention is to provide a diluting and pouring apparatus of the above mentioned type by which the diluted liquid food to be served is maintained at a constant temperature while agitated to prevent any diposition of contents of the liquid food so that the diluted liquid food can be served at any time.

In order to achieve this object, according to the present invention a tank for reserving the diluted liquid food discharged from the third chamber is provided and means for supplying a flow of steam into the reservoir.

A still further object of the present invention is to provide a diluting and pouring apparatus of the type by which the dilution of the liquid food in the tank is performed at high speed while keeping the temperature of the diluted liquid food constant.

In order to achieve this object, according to the present invention, means for supplying a flow of steam into the third chamber.

BRIEF DESCRIPTION OF THE DRAWINGS

FIG. 3 shows a main portion of another embodiment.

DETAILED DESCRIPTION OF THE PREFERRED EMBODIMENTS

Figure 1:
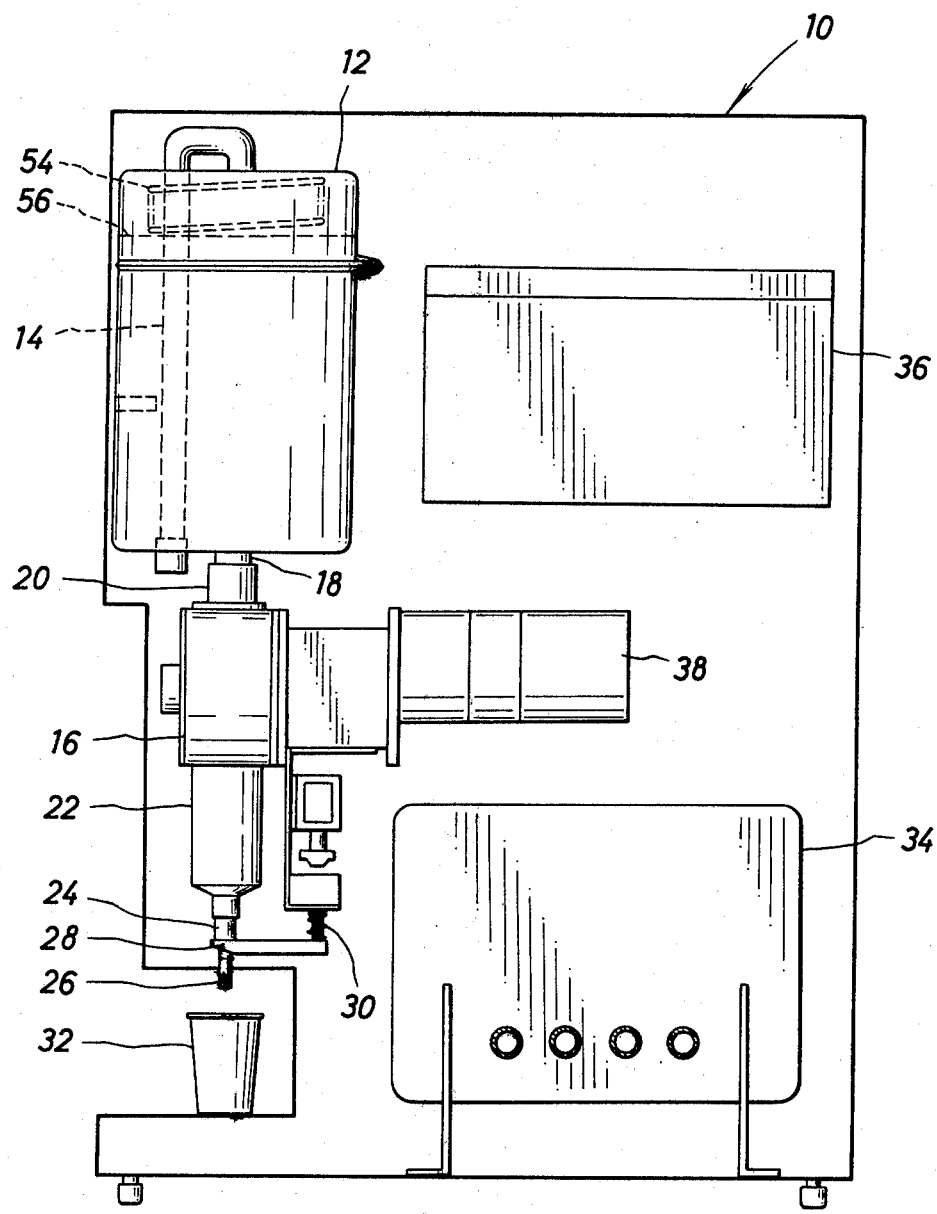
FIG. 1 is a schematic side view of a first embodiment of the present invention.

Describing, firstly, the first embodiment of the present diluting and pouring apparatus with reference to FIG. 1, the apparatus comprises a housing 10 which is shown schematically and in which main components are arranged.

A condensed liquid food tank 12 is mounted detachably in an upper front portion of the housing 10 by a suitable means not shown. The tank 12 contains a condensed liquid food such as corn soup whose desnsity may be about twice that when served and the condensed liquid food is maintained at a constant temperature, say, about 0° to 5° C. The tank 12 is equiped with any conventional level indicator 14 which is visible externally.

Beneath the tank 12, a casing 16 in the shape of drum is fixedly mounted.

The tank 12 and the casing 16 are connected to each other through joint members 18 and 20 provided at the bottom of the tank 12 and the top of the casing 16, respectively so that the condensed liquid food can be flown by gravity from the tank 12 to the casing 16. A constant amount of heated water as a diluent is supplied through another passage to the casing. The diluent supplied to the casing is mixed therein with the condensed liquid food supplied from the tank 12 to dilute the liquid food. A flow of steam is also introduced into the casing 16 to wash the inside of the latter.

The liquid food, for example, corn soup, diluted and maintained at the desired temperature in the casing 16 is discharged from the casing into a diluted liquid food tank 22 provided below and communicated with the casing 16 and reserved therein.

A pouring pipe 26 having a valve 24 is provided below the tank 22. The valve 24 is opened when a lever 28 is lifted against a spring 30. Since the structure of the valve and the associated components therewith are well known, the detailes thereof are not described.

A flow of steam may be introduced into the tank 22 to keep the temperature of the diluted corn soup while agitating the latter.

By putting a cup 22 below the pouring pipe 26 and lifting the lever 28, the suitably diluted and heated corn soup free from deposition of the contents can be poured thereinto.

In FIG. 1, an electric heating type boiler 34 is used as sources of the heated water and the steam for agitation and temperature keeping.

In the housing, a casing 36 containing source electric circuits for controlling the operation of the apparatus is also provided, which will be described later. The rotor supported in the casing 16 is driven by a motor 38 also provided in the housing 10.

Figure 2:
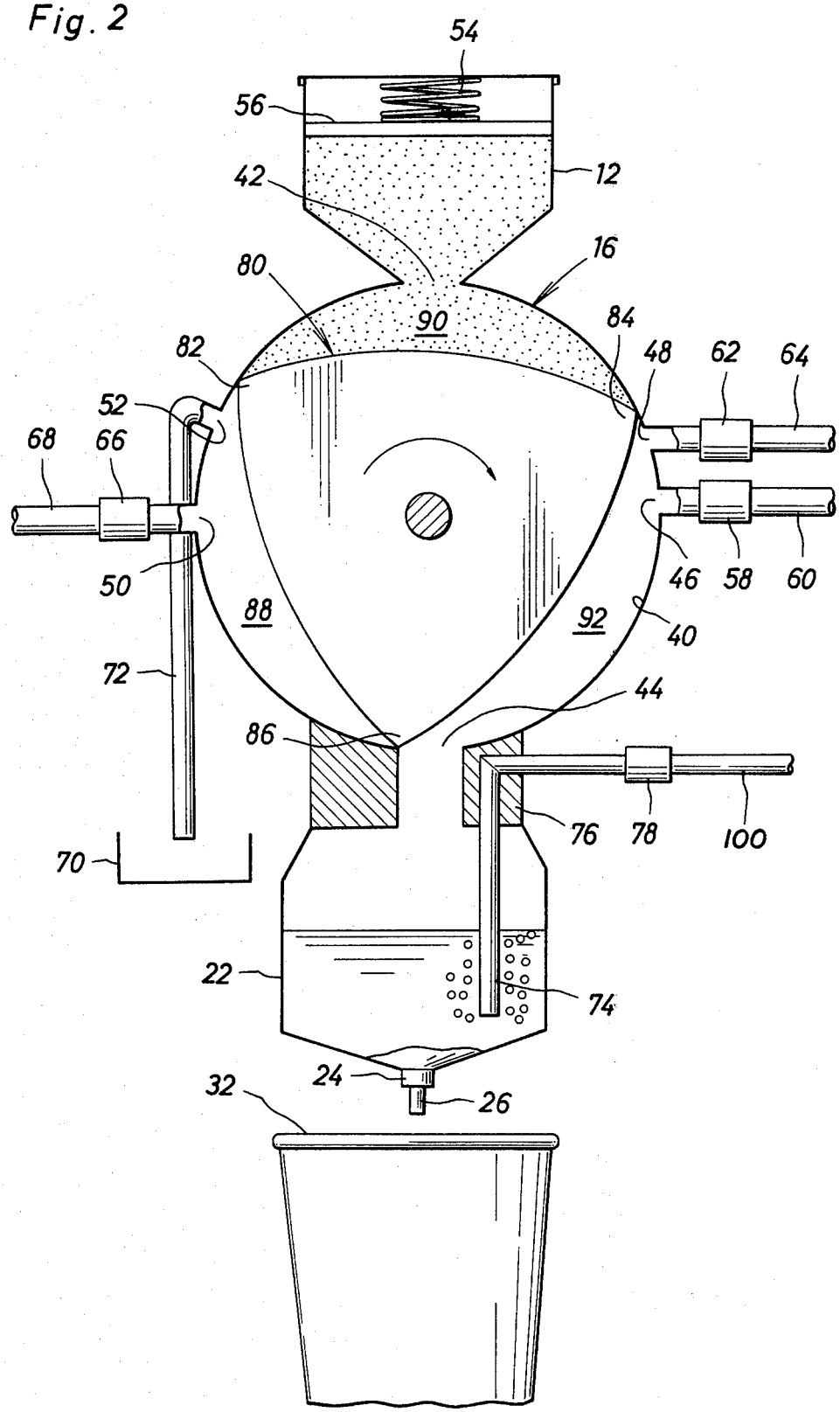
FIG. 2 shows a main portion of the present apparatus shown in FIG. 1.

The mutual connection between the condensed liquid food tank 12, the casing 16 and the diluted liquid food tank 22, the internal structure of the casing 16 and the mechanism for supplying the heated water and stem into the casing 16 will be clear from FIG. 2.

In FIG. 2, the casing 16 has a circular inner peripheral face 40 in which a condensed liquid food inlet port 42 and a pouring port 44 are formed in the uppermost portion and the lowermost portion thereof. In one side portion of the peripheral face 40 and between the inlet 42 and the pouring port 44, a diluent inlet port 46 and a steam inlet port 48 are formed and in the other side portion and between the ports 42 and 44, a washing medium inlet and outlet ports 50 and 52 are formed, respectively.

The condensed liquid food inlet port 42 is communicated through the joints 18 and 20 (FIG. 1) with the condensed liquid food tank 12 and the pouring port 44 is communicated with the diluted liquid food tank 22.

A piston 56 is provided in the tank 12. The piston 56 is downwardly biased by a spring 54 to enhance the flow of the raw liquid food to the casing 16.

The diluent inlet port 46 is connected through a pipe 60 having an electromagnetic valve 58 to the boiler 34 so that when the electromagnetic valve 58 is opened, the boiler 34 supplies the heated water as the diluent to the casing 16.

The steam inlet port 48 is also connected through a pipe 64 having an electromagnetic valve 62 to the boiler 34 so that when the valve 62 is opened, a flow of steam is supplied from the boiler 34 to the casing 16.

The washing medium inlet port 50 is also connected through a pipe 68 having an electromagnetic valve 66 to the boiler 34 so that the valve 66 is opened, a flow of steam is supplied to the casing as in the case of the steam inlet port 48.

A drain pipe 72 which extends to a drain pan 70 is connected to the washing medium outlet port 52.

In the diluted liquid food tank 22, a pipe 74 for jetting a flow of steam is arranged. The latter pipe is supported by an upper wall portion 76 of the tank 22 and connected through a pipe 100 having an electromagnetic valve 78 to the boiler 34 so that the valve 78 is opened the flow of steam is supplied into the tank 22.

A rotor 80 having a substantially triangle shape is rotatably supported in the casing 16. The rotor 80 is rotated with three apexes 82, 84 and 86 thereof being in slidable contact with the inner peripheral face 40 of the casing 16, so that there are three crescent shaped chambers 88, 90 and 92 provided equiangularly and liquid tightly, which are the same in volume and moved along the face 40 with the rotation of the rotor 80.

The rotor 80 is coupled with the motor 88 (FIG. 1) and is rotatable intermetently by 120° each time when the motor 38 is driven by operating suitable push bottom etc. (not shown). Therefore, when the rotor 80 is rotated by 120°, the chambers 88, 90 and 92 are also moved in the same direction as the rotating direction of the rotor by 120°, respectively.

Thus, when it is assumed that the rotor 80 is stationary in the position shown in FIG. 2, the chamber 88 is communicated with the washing medium inlet port 50 through which steam is supplied and with the washing medium outlet port 52 connected to the drain pipe 72. Therefore, the chamber 88 is supplied with a certain constant amount of steam when the electromagnetic valve 66 is opened for a certain constant time. The steam introduced functions to wash the interior of the chamber as well as to sterilize it before discharged through the drain pipe 72.

The chamber 90 communicates with the condensed liquid food inlet port 42 and is supplied automatically with a constant amount of the condensed liquid food corresponding to the volume thereof.

The chamber 92 is communicated with the diluent inlet port 46, the steam supply port 48 and the pouring port 44.

When the rotor 80 is rotated in the arrow direction from the shown position by 120°, the chambers 88, 90 and 92 are also moved by 120°, respectively. Therefore, the chamber 88 which has been washed is communicated with the condensed liquid food inlet port 42 and filled therewith. The chamber 90 which has been filed with the constant amount of the condensed liquid food is communicated firstly with the diluent inlet port 46 and the steam supply port 48 where the liquid food therein is diluted with the heated water while agitated by the steam by properly actuating the valves 58 and 62 and then communicated with the pouring port 44 through which is discharged into the tank 22 with the aid of the steam pressure. The chamber 92 is communicated with the washing medium inlet and outlet ports 50 and 52 and subjected to the washing and sterilization.

The final product, i.e., diluted liquid food reserved in the tank 22 is agitated by a supply of steam through the pipe 74 with the valve 78 being opened while the temperature thereof is maintained thereby. Therefore, there is no disposition of contents of the liquid food in the tank 22. By opening the valve 24 of the pouring pipe 26, the liquid food which is properly heated and is diposited free can be served.

By the next rotation of the rotor 80 by 120°, the above matters are repeated for the chambers cyclically. Therefore, the constant amount of the diluted liquid food can be served within a short time continuously.

Although the steam is described as the washing medium to be supplied to the inlet port 50, a hot water may be used for the same purpose.

FIG. 3 shows another embodiment in which the same components as those in the preceding embodiment are shown by the same reference numerals. In FIG. 3, the steam pipe 74 is connected to the washing medium outlet port 52 of the casing. With this structure, it is possible to reuse the steam which has washed the chamber to agitate and maintain the temperature of the liquid food in the tank 22.

Although soup is described to some extent as an example of the liquid food which can be served by the diluting and pouring apparatus according to the present invention, it should be noted that the present invention can be applied to any other liquid foods than soup.

What is claimed is:

1. A diluting and pouring apparatus for liquid food, comprising a casing having a circular inner peripheral face and being formed in said inner peripheral face with a raw liquid food inlet port, a diluent inlet port, a pouring port, a washing medium inlet port and a washing medium outlet port, a rotor rotatably supported within said casing, said rotor being substantially triangular in shape providing three equiangularly spaced apexes, said apexes being in slidable contact with said circular inner peripheral face so that a first, second and third chambers having the same volume are formed within said casing and said chambers are moved along said inner peripheral face with a rotation of said rotor and means for driving said rotor, said chambers having such relation to said raw liquid food inlet port, said diluent inlet port, said pouring port, said washing medium inlet port and said washing medium outlet port so that, when said first chamber is in a washing state and communicates with said washing medium inlet and outlet ports, said second chamber is a filling state and communicates with said raw liquid food inlet port and said third chamber is in a diluting and pouring state and communicates with said diluent inlet port and said pouring port, whereby said first chamber is washed by a washing medimum supplied through said washing medium inlet port and discharged from said washing medium outlet port, said second chamber is filled with the raw liquid food supplied through said raw liquid food inlet port and said third chamber is supplied through said diluent inlet port with a diluent so that the raw liquid food therein is diluted with the diluent and then diluted liquid food is poured through said pouring port, said states of said chambers being segmentially exchanged with the rotation of said rotor.

2. A diluting and pouring apparatus for liquid food claimed in claim 1, wherein said raw liquid food inlet port and said pouring port are provided in upper and lower portions of said casing, respectively and further comprising a raw liquid food tank disposed above said casing and communicating with said raw liquid food inlet port.

3. A diluting and pouring apparatus for liquid food claimed in claim 1, further comprising a reserving tank for reserving the diluted liquid food poured through said pouring port and means for introducing a flow of steam into said reserving tank.

4. A diluting and pouring apparatus for liquid food claimed in claim 1, wherein said casing is further formed with a steam supply port to be communicated with any of said chambers moved to a position where it is communicated with said diluent and pouring ports, whereby the diluted liquid food in said chamber is agitated and pressingly poured by the steam through said pouring port.

* * * * *